(12) United States Patent
Wei et al.

(10) Patent No.: US 9,361,258 B2
(45) Date of Patent: Jun. 7, 2016

(54) COMMON INTERFACE/CONDITIONAL ACCESS MODULE AND METHOD OF TRANSMITTING DATA BETWEEN COMMON INTERFACE CARD AND INTEGRATED CIRCUIT CHIP THEREOF

(71) Applicant: S2-Tek Inc., Hsin-Chu (TW)

(72) Inventors: Feng-Chi Wei, Hsinchu (TW); Yu-Chung Wang, Taichung (TW); Hsiang-Chi Hsieh, Hsinchu County (TW); Tsan-Hwi Chen, Hsinchu (TW)

(73) Assignee: RDA TECHNOLOGIES LIMITED, Shatin (HK)

( * ) Notice: Subject to any disclaimer, the term of this patent is extended or adjusted under 35 U.S.C. 154(b) by 341 days.

(21) Appl. No.: 14/059,440

(22) Filed: Oct. 21, 2013

(65) Prior Publication Data

US 2015/0113194 A1  Apr. 23, 2015

(51) Int. Cl.
*G06F 13/14* (2006.01)
*G06F 13/36* (2006.01)
*G06F 13/40* (2006.01)

(52) U.S. Cl.
CPC ................... *G06F 13/4027* (2013.01)

(58) Field of Classification Search
None
See application file for complete search history.

(56) References Cited

U.S. PATENT DOCUMENTS

| | | | |
|---|---|---|---|
| 7,058,803 B2* | 6/2006 | Carr | H04N 7/163 348/E5.004 |
| 7,552,457 B2* | 6/2009 | Van De Ven | H04N 7/163 380/210 |
| 2005/0180467 A1* | 8/2005 | Kim | H04H 20/28 370/536 |

* cited by examiner

*Primary Examiner* — David E Martinez
(74) *Attorney, Agent, or Firm* — Winston Hsu; Scott Margo

(57) ABSTRACT

A common interface (CI)/conditional access (CA) module is used to transmit a conditional access data/command and a transport stream in an interleaving manner between a common interface card and an integrated circuit module having a conditional access module. With the aid of the CI/CA module, a same port can be shared for transmitting the conditional access data/command and the transport stream, instead of using two different and separated ports.

20 Claims, 13 Drawing Sheets

COMMON INTERFACE/CONDITIONAL ACCESS MODULE AND METHOD OF TRANSMITTING DATA BETWEEN COMMON INTERFACE CARD AND INTEGRATED CIRCUIT CHIP THEREOF

BACKGROUND OF THE INVENTION

1. Field of the Invention

The present invention relates to a common interface/conditional access (CI/CA) module and a method of transmitting data between a common interface card and an integrated circuit chip thereof.

2. Background

In a digital television, an integrated circuit (IC) chip is utilized for transmitting encoded TV signals to a common interface (CI) card for descrambling. The encoded TV signals may include control data or addresses for the CI card from a conditional access bus.

For transmitting the conditional access data/command between the CI card and the IC chip, the CI card has a data bus or an address bus, and the IC chip has a corresponding data bus or address bus. For transmitting the transport stream between the CI card and the IC chip, the CI card has a transport stream bus, and the IC chip has a corresponding stream bus.

However, since the IC chip uses two buses, i.e., the corresponding conditional access bus and the transport stream bus, for transmitting the conditional access data/command and the transport stream, more pins are needed for data transmission.

DETAILED DESCRIPTION

Figure 1:
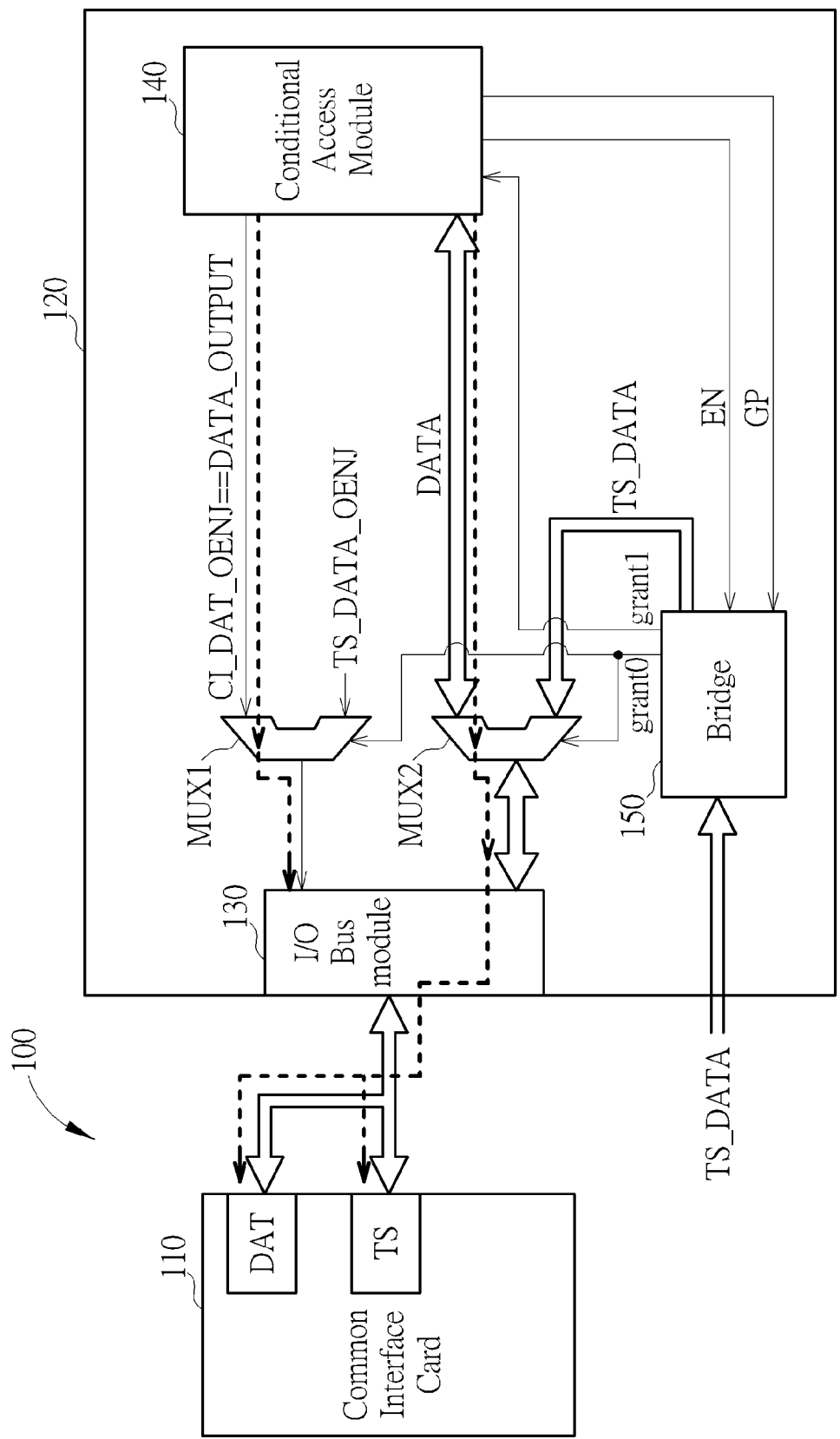
FIG. 1 illustrates a CI/CA module under a data output mode according to a first embodiment.

A common interface/conditional access (CI/CA) module and a method of transmitting data are disclosed to reduce pins of the IC chip of the digital television. FIG. 1 illustrates a CI/CA module 100 according to a first embodiment, where the CI/CA module 100 is under a data output mode. As shown in FIG. 1, the CI/CA module 100 includes a common interface card 110 and an integrated circuit chip 120.

The common interface card 110 according to FIG. 1 includes a data bus DAT and a transport stream bus TS.

The IC chip 120 includes at least an input/output (I/O) bus module 130, a conditional access module 140, a bridge 150, a first multiplexer MUX1, and a second multiplexer MUX2.

The I/O bus module 130 has a first bus coupled to the data bus DAT and the transport stream bus TS of the common interface card 110. The bridge 150 has a first bus for receiving a transport stream TS_DATA and is configured to set a first grant signal grant0 and a second grant signal grant1 according to a grant period signal GP; for example, the bridge 150 may be configured to set a period of the first grant signal grant0 and a period of the second grant signal grant1. The conditional access module 140 has a first terminal coupled to a first terminal of the bridge 150 and is configured to enable the bridge 150 via a grant signal EN. The conditional access module 140 has a second terminal coupled to a second terminal of the bridge 150 and configured to provide the grant period signal GP to the bridge 150. The conditional access module 140 has a grant terminal coupled to a third terminal of the bridge 150 and is configured to receive the second grant grant1 from the bridge 150 for enabling transmission of a conditional access data/command DATA.

The first multiplexer MUX1 has a first terminal coupled to a first terminal of the I/O bus module 130 and is configured to transmit an I/O control signal to the I/O bus module 130 for controlling an I/O mode of the I/O bus module 130. The first multiplexer MUX1 has a second terminal coupled to a third terminal of the conditional access module 140 and is configured to transmit a data I/O switch signal CI_DAT_OENJ. The first multiplexer MUX1 has a third terminal configured to receive a transport stream I/O switch signal TS_DATA_OENJ. The first multiplexer MUX1 has a select terminal coupled to a fourth terminal of the bridge 150 and is configured to receive the first grant signal grant0 for coupling the first terminal of the first multiplexer MUX1 to the second terminal of the first multiplexer MUX1 or the third terminal of the first multiplexer MUX1.

The second multiplexer MUX2 has a first bus coupled to a second bus of the I/O bus module 130. The second multiplexer MUX2 has a second bus coupled to a first bus of the conditional access module 140 and is configured to transmit the conditional access data/command DATA. The second multiplexer MUX2 has a third bus coupled to a second bus of the bridge 150 and is configured to receive the transport stream TS_DATA from the bridge 150. The second multiplexer MUX2 has a select terminal coupled to the fourth terminal of the bridge 150 and is configured to receive the first grant signal grant0 from the bridge 150 for coupling the first bus of the second multiplexer MUX2 to the second bus of the second multiplexer MUX2 or the third bus of the second multiplexer MUX2.

Under the data output mode of the CI/CA module 100, control data for the CI/CA module 100 is outputted from the conditional access module 140 to the common interface card 110 for controlling display details of a digital television having the CI/CA module 100.

Operations under the data output mode are introduced in the following paragraphs. Under the data output mode of the CI/CA module 100, operations of the CI/CA module 100 includes:

(1-1) The select terminal of the first multiplexer MUX1 is configured to receive the first grant signal grant0 in response to the first grant signal grant0, the first multiplexer MUX1 is configured to couple the first terminal of the first multiplexer MUX1 to the second terminal of the first multiplexer MUX1. Therefore, the I/O bus module 130 receives the data I/O switch signal CI_DAT_OENJ from the conditional access module 140. Note that a current value DATA_OUTPUT of the data I/O switch signal CI_DAT_OENJ is configured to indicate the data output mode of the CI/CA module 100.

(1-2) The select terminal of the second multiplexer MUX2 is configured to receive the first grant signal grant0 in response to the first grant signal grant0, the second multiplexer MUX2 is configured to couple the first bus of the second multiplexer MUX2 to the second bus of the second multiplexer MUX2.

(1-3) The grant terminal of the conditional access module 140 is configured to receive the second grant signal grant1; in response to the second grant signal grant1, the transmission of the conditional access data/command DATA from the first bus of the conditional access module 140 to the second bus of the second multiplexer MUX2 is enabled.

According to operations in (1-2) and (1-3), the conditional access data/command DATA, is transmitted from the conditional access module 140 to the I/O bus module 130. In response to the value DATA_OUTPUT of the data I/O switch signal CI_DAT_OENJ, according to operations in (1-1), the I/O bus module 130 is further controlled to transmit the conditional access data/command DATA to the common interface card 110, i.e., to the data bus DAT, and the transport stream bus TS. Note that the conditional access data/command DATA cannot be identified by the transport stream bus TS, that is, the conditional access data/command DATA is blocked at the transport stream bus TS, and the conditional access data/command DATA is only identifiable at the data bus DAT for further decoding by the common interface card 110. In some embodiments, the conditional access data/command DATA under the data output mode of the CI/CA module 110 includes control data for the common interface card 110.

Figure 2:
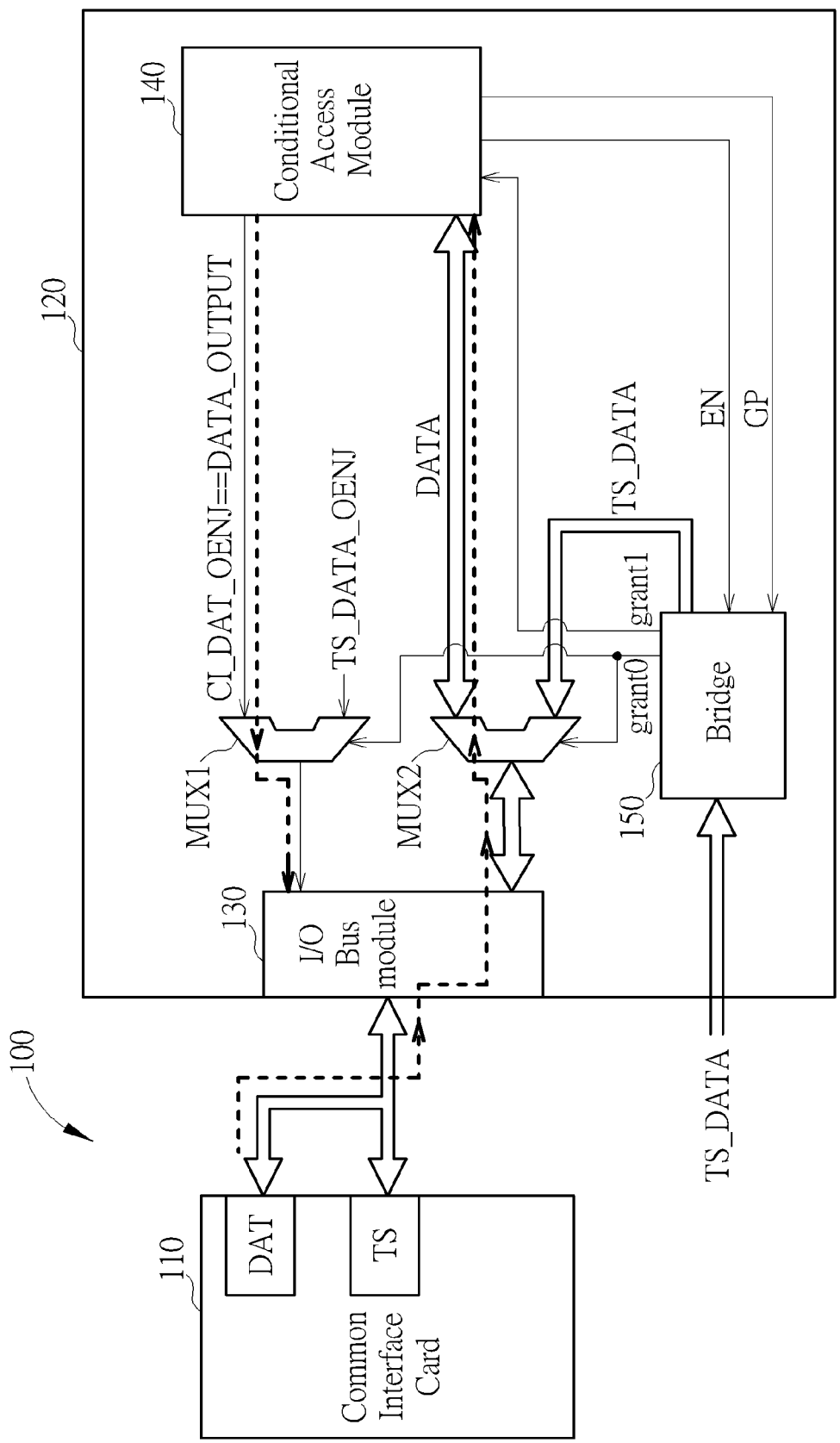
FIG. 2 illustrates the CI/CA module shown in FIG. 1 under a data input mode of the CI/CA module according to the first embodiment.

FIG. 2 illustrates the CI/CA module 100 shown in FIG. 1 under a data input mode of the CI/CA module 100 according to the first embodiment.

Under the data input mode of the CI/CA module 100, feedback data from the CI/CA module 100 is transmitted from the common interface card 110 to the conditional access module 140 for future information about generating display details of the digital television having the CI/CA module 100.

Operations under the data input mode are introduced in the following paragraphs. Under the data input mode of the CI/CA module 100, operations of the CI/CA module 100 include:

(2-1) The select terminal of the first multiplexer MUX1 is configured to receive the first grant signal grant0, in response to the first grant signal grant0, the first multiplexer MUX1 is configured to couple the first terminal of the first multiplexer MUX1 to the second terminal of the first multiplexer MUX1. Therefore, the I/O bus module 130 receives the data I/O switch signal CI_DAT_OENJ from the conditional access module 140. Note that a current value DATA_INPUT of the data I/O switch signal CI_DAT_OENJ is configured to indicate the data input mode of the CI/CA module 100.

(2-2) The select terminal of the second multiplexer MUX2 is configured to receive the first grant signal grant0; in response to the first grant signal grant0, the second multiplexer MUX2 is configured to couple the first bus of the second multiplexer MUX2 to the second bus of the second multiplexer MUX2.

(2-3) The grant terminal of the conditional access module 140 is configured to receive the second grant signal grant1; in response to the second grant signal grant1, transmission of the conditional access data/command DATA from the second bus of the second multiplexer MUX2 to the first bus of the conditional access module 140 is enabled.

In response to the value DATA_INPUT of the data I/O switch signal CI_DAT_OENJ, according to operations in (2-1), the I/O bus module 130 is controlled to receive the conditional access data/command DATA under the data input mode, from the data bus DAT of the common interface card 110 to the I/O bus module 130. Furthermore, according to operations in (2-2) and (2-3), the conditional access data/command DATA is further transmitted from the I/O bus module 130 to the conditional access module 140. In some embodiments, the conditional access data/command DATA under the data input mode of the CI/CA module 110 includes feedback data as future information for generating the control data for the common interface card 110.

Figure 3:
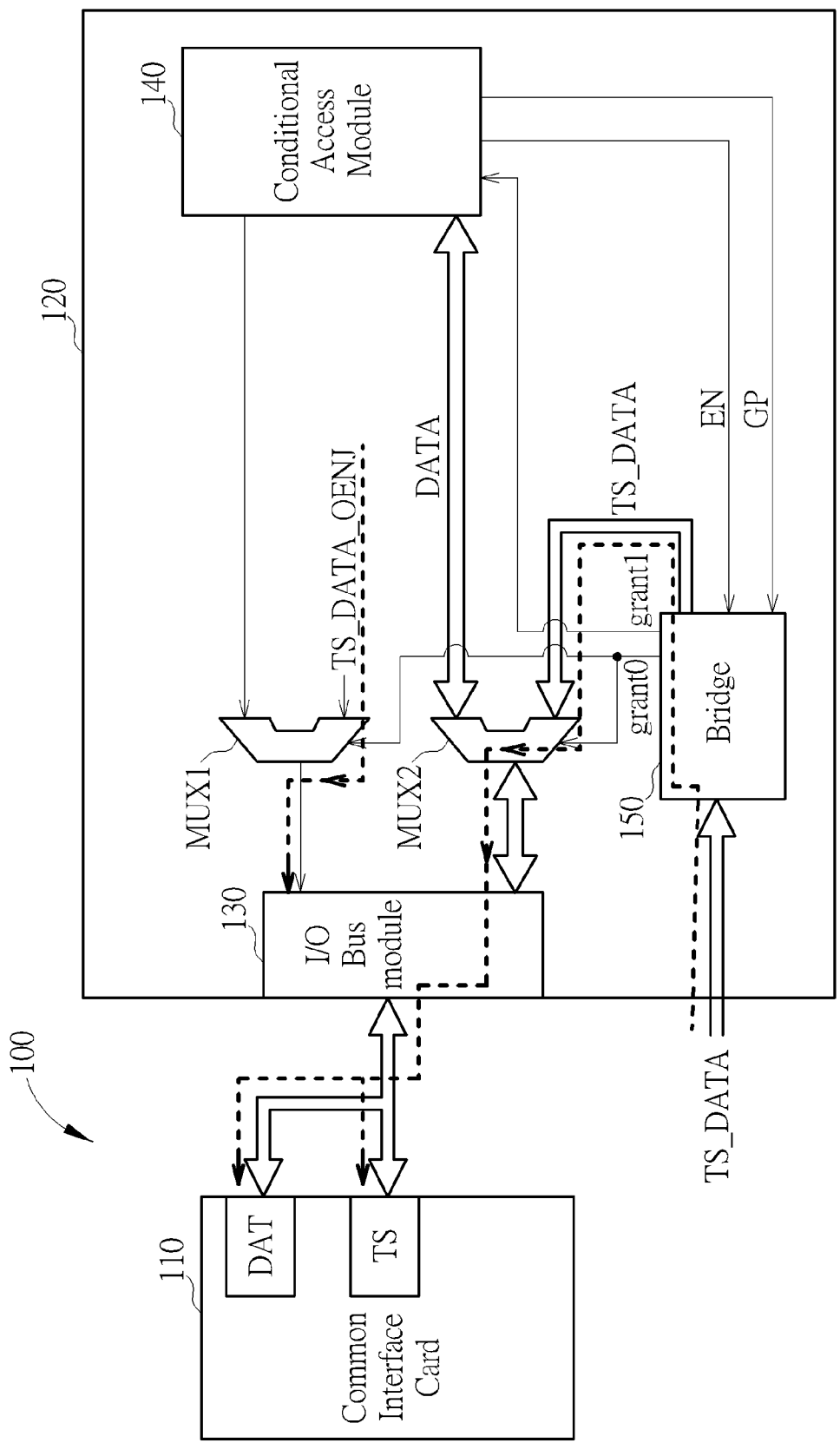
FIG. 3 illustrates the CI/CA module shown in FIG. 1 under a transport stream mode of the CI/CA module according to the first embodiment.

FIG. 3 illustrates the CI/CA module 100 shown in FIG. 1 under a transport stream mode of the CI/CA module 100 according to the first embodiment.

Under the transport stream mode of the CI/CA module 100, transport stream TS_DATA transmitted from an external transport stream source and processed by the bridge 150 is further transmitted to the common interface card 110.

Operations under the transport stream mode of the CI/CA module 100 are introduced in the following paragraphs. Under the transport stream mode of the CI/CA module 100, operations of the CI/CA module 100 include:

(3-1) The select terminal of the first multiplexer MUX1 is configured to receive the first grant signal grant0; in response to the first grant signal grant0, the first multiplexer MUX1 is configured to couple the first terminal of the first multiplexer MUX1 to the third terminal of the first multiplexer MUX1. Therefore, the I/O bus module 130 receives a transport stream I/O switch signal TS_DATA_OENJ, which indicates the transport stream mode of the CI/CA module 100.

(3-2) The select terminal of the second multiplexer MUX2 is configured to receive the first grant signal grant0; in response to the first grant signal grant0, the second multiplexer MUX2 is configured to couple the first bus of the second multiplexer MUX2 to the third bus of the second multiplexer MUX2.

(3-3) The bridge 150 is configured to receive the third grant signal EN to start transmitting the transport stream TS_DATA to the third bus of the second multiplexer MUX2, the first grant signal grant0 to the select terminal of the second multiplexer MUX2 and the select terminal of the first multiplexer MUX1, and second grant signal grant1 to the grant terminal of the conditional access module 140.

According to operations in (3-2), the transport stream TS_DATA is transmitted from the bridge 150 to the I/O bus module 130. In response to the transport stream I/O switch signal TS_DATA_OENJ, according to operations in (3-1), the I/O bus module 130 is controlled to transmit the transport stream TS_DATA from the I/O bus module 130 to the data bus DAT and the transport stream bus TS of the common interface card 110. Note that the transport stream TS_DATA cannot be identified by data bus DAT in format, that is, the transport stream TS_DATA is blocked at the data bus DAT, and transport stream. TS_DATA is only identifiable for the transport stream bus TS for further decoding by the common interface card 110.

Figure 4:
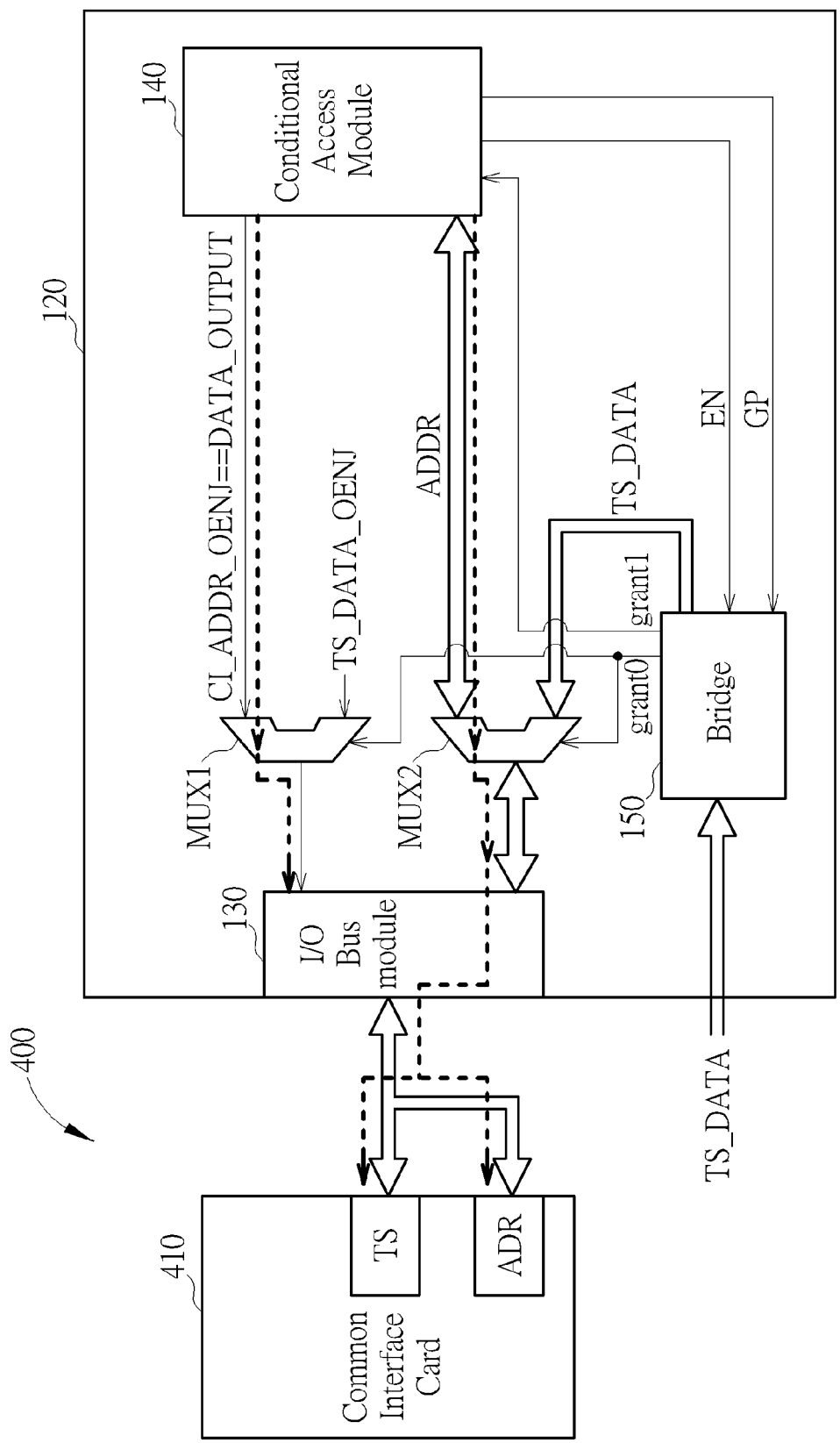
FIG. 4 illustrates a CI/CA module under an address output mode of the CI/CA module according to a second embodiment.

FIG. 4 illustrates a CI/CA module 400 under an address output mode of the CI/CA module 400 according to a second embodiment.

The common interface card 410 according to FIG. 4 includes an address bus ADR and a transport stream bus TS.

Under the address output mode of the CI/CA module 400, control addresses for the CI/CA module 400 are outputted from the conditional access module 140 to the common interface card 410 for controlling addresses for operations of the digital television having the CI/CA module 400.

Operations under the address output mode are introduced in the following paragraphs. Under the address output mode of the CI/CA module 400, operations of the CI/CA module 400 include:

(4-1) The select terminal of the first multiplexer MUX1 is configured to receive the first grant signal grant0; in response to the first grant signal grant0, the first multiplexer MUX1 is configured to couple the first terminal of the first multiplexer MUX1 to the second terminal of the first multiplexer MUX1. Therefore, the I/O bus module 130 receives an address I/O switch signal CI_ADDR_OENJ from the conditional access module 140. Note that a current value ADDR_OUTPUT of the address I/O switch signal CI_ADDR_OENJ is configured to indicate the address output mode of the CI/CA module 300.

(4-2) The select terminal of the second multiplexer MUX2 is configured to receive the first grant signal grant0; in response to the first grant signal grant0, the second multiplexer MUX2 is configured to couple the first bus of the second multiplexer MUX2 to the second bus of the second multiplexer MUX2.

(4-3) The grant terminal of the conditional access module 140 is configured to receive the second grant signal grant1; in response to the second grant signal grant1, the transmission of an address ADDR from the first bus of the conditional access module 140 to the second bus of the second multiplexer MUX2 is enabled.

According to operations in (4-2) and (4-3), the address ADDR under the address output mode, is transmitted from the conditional access module 140 to the I/O bus module 130. In response to the value ADDR_OUTPUT of the address I/O switch signal CI_ADDR_OENJ, according to operations in (4-1), the I/O bus module 130 is controlled to transmit the address ADDR under the address output mode, from the I/O bus module 130 to the transport stream bus TS, and the address bus ADR of the common interface card 410. Note that the address ADDR cannot be identified by the transport stream bus TS, that is, the address ADDR is blocked at the transport stream bus TS, and the address ADDR is only identifiable at the address bus ADR for further utilization by the common interface card 410. In some embodiments, the address ADDR under the address output mode of the CI/CA module 400 includes control addresses for the common interface card 410.

Figure 5:
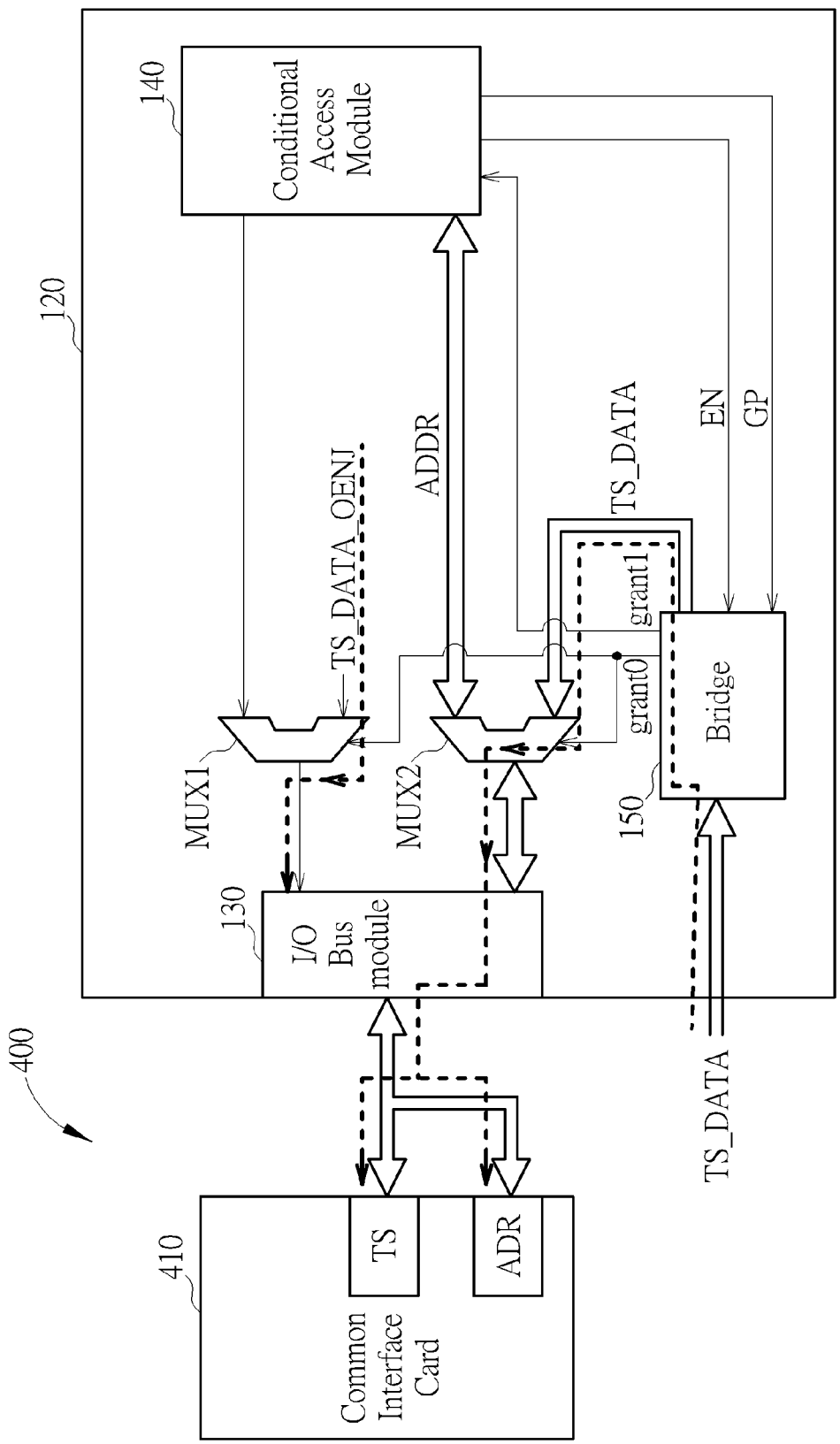
FIG. 5 illustrates the CI/CA module shown in FIG. 4 under a transport stream mode of the CI/CA module according to the second embodiment.

FIG. 5 illustrates the CI/CA module 400 shown in FIG. 4 under the transport stream mode of the CI/CA module 400 according to the second embodiment.

Operations under the transport stream mode of the CI/CA module 400 are substantially the same as the transport stream mode of the CI/CA module 100 shown in FIG. 3. Repeated operations related to FIG. 5 are not further described for brevity.

In some embodiments, waveforms of the first grant signal grant0 and the second grant signal grant1 are controlled by the bridge 150 to make sure each one of the data output mode, the data input mode, and the address output mode is separately run with the transport stream mode, for the purpose of transmitting the conditional access data/command DATA related to the conditional access module 140 and the transport stream TS_DATA separately.

Figure 6:
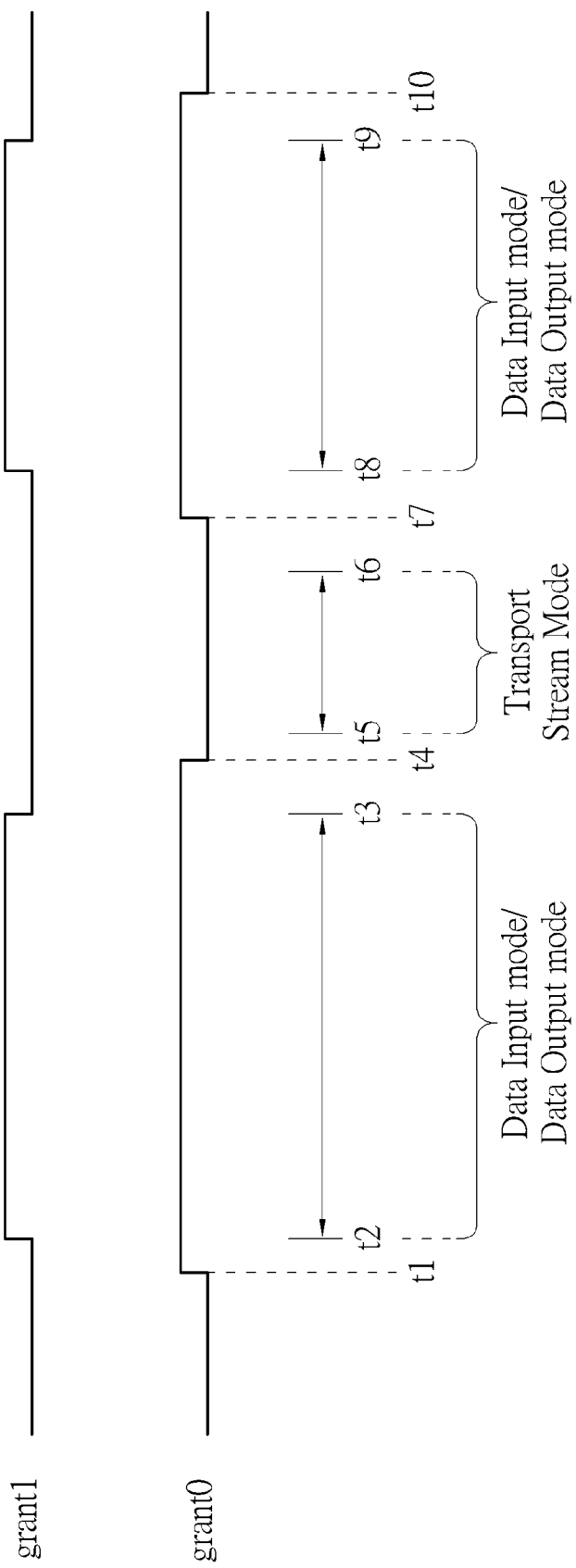
FIG. 6 illustrates a waveform of separately running the data output mode (or the data input mode) and the transport data mode of the CI/CA module shown in FIG. 1 according to the first embodiment.

FIG. 6 which illustrates a waveform of separately running the data output mode (or the data input mode) and the transport data mode of the CI/CA module 100 shown in FIG. 1 according to the first embodiment.

As shown in FIG. 6, one of the data input mode and the data output mode is interleaved with the transport stream mode in a separated manner, where one clock period is periodically formed by combining one time of one of the data input mode and the data output mode and one time of the transport stream mode; that is, a time frame from a moment t1 to a moment t7 shown in FIG. 6, where one of the data input mode and the data output mode is run between the moment t1 and a moment t4. And the transport stream mode is run between the moment t4 and the moment t7. Moreover, the conditional access data/command DATA is transmitted between a moment t2 and a moment t3, and a transport stream is transmitted between a moment t5 and a moment t6.

Conventionally, i.e., in the prior art, one clock period of a conventional CI/CA module is only utilized for transmitting a conditional access data/command, and transmission of a transport stream is required to be additionally assigned. Therefore, efficiency of transmitting the conditional access data/command and the transport stream may be significantly reduced by unconditionally transmitting the transport stream.

However, in the embodiment shown in FIG. 6, the transmission rate of one of the data input mode and the data output mode is accelerated so that only the time frame between the moment t2 and the moment t3 shown in FIG. 6 is required to periodically transmit the conditional access data/command DATA on top of that, in one single clock period, there will be an additional time frame from the moment t5 to the moment t6 for transmitting the transport stream periodically, and it will raise the efficiency of transmitting the conditional access data/command DATA and the transport stream TS_DATA significantly in comparison to the conventional CI/CA module.

Please also refer to FIGS. 1-3. As shown in FIG. 6, assume that both the first grant signal grant0 and the second grant signal grant1 are binary signals; therefore, according to the embodiment shown in FIG. 6, it is assumed that one of the data input mode and the data output mode is primarily corresponding to a logic high of the first grant signal grant0 and the second grant signal grant1, and that the transport stream mode is primarily corresponding to a logic low of the first grant signal grant0 and the second grant signal grant1.

As shown in FIG. 6, under one of the data input mode and the data output mode currently-run, the first multiplexer MUX1 is switched to couple the first terminal of the first multiplexer MUX1 to the second terminal of the first multiplexer MUX1 so that the I/O bus module 130 is capable of receiving the data I/O switch signal CI_DAT_OENJ from the conditional access module 140, in response to the logic high of the first grant signal grant0 at the moment t1; and the second multiplexer MUX2 is switched to couple the first bus of the second multiplexer MUX2 to the second bus of the second multiplexer MUX2, in response to the logic high of the first grant signal grant0 at the moment t1.

At the moment t2, which is shortly after the moment t1, the second grant signal grant1 is changed to a logic high; in response to the second grant signal grant1 having the logic high, the conditional access module 140 starts the transmission of the conditional access data/command DATA, i.e., starts one of the data output mode and the data input mode.

At the moment t3, the second grant signal grant1 is changed to a logic low; in response to the second grant signal grant1 having a logic low, the conditional access module 140 stops the transmission of the conditional access data/command DATA at the moment t3. At this time, the CI/CA module 100 quits one of the data input mode and the data output mode.

At the moment t4, the first grant signal grant0 is changed to a logic low; in response to the logic low of the first grant signal grant0, the second multiplexer MUX2 is switched to decouple the first bus of the second multiplexer MUX2 from the second bus of the second multiplexer MUX2, i.e., to couple the first bus of the second multiplexer MUX2 to the third bus of the second multiplexer MUX2, and the first multiplexer MUX1 is also switched at the moment t4 for decoupling the first terminal of the first multiplexer MUX1 from the second terminal of the first multiplexer MUX1, i.e., for coupling the first terminal of the first multiplexer MUX1 to the third terminal of the first multiplexer MUX1.

A first delay between the moment t1 and the moment t2 and a second delay between the moment t3 and the moment t4 are preserved for an I/O transaction time of the I/O bus module 130 corresponding to the transmission of the conditional access data/command DATA.

Transmission of the transport stream TS_DATA, i.e., the transport stream mode of the CI/CA module 100, is begun by the bridge 150 at the moment t5 shortly after the moment t4, and is then stopped by the bridge 150 at the moment t6.

A third delay from the moment t4 to the moment t5 and a fourth delay from the moment t6 to the moment t7 are preserved for an I/O transaction time of the I/O bus module 130 corresponding to the transmission of the transport stream TS_DATA.

Shortly after the moment t6, the first grant signal grant0 is changed to a logic high at the moment t7; in response to the logic high of first grant signal grant0 at the moment t7, the first multiplexer MUX1 is switched to decouple the first terminal of the first multiplexer MUX1 from the third terminal of the first multiplexer MUX1, i.e., to couple the first terminal of the first multiplexer MUX1 to the second terminal of the first multiplexer MUX1; and the second multiplexer MUX2 is switched to decouple the first bus of the second multiplexer MUX2 from the third bus of the second multiplexer MUX2, i.e., to couple the first bus of the second multiplexer MUX2 to the second bus of the second multiplexer MUX2.

At the moment t8, the second grant signal grant1 is changed to a logic high; in response to the second grant signal grant1 having the logic high, the conditional access module 140 starts transmission of the conditional access data/command DATA of the next-period.

At this time, the CI/CA module 100 enters the data output mode or the data input mode again.

The interleaving of the transport stream mode and the data output mode (the data input mode) is periodically performed on the CI/CA module 100. For example, after the transmission of the conditional access data/command DATA of the next-period is stopped by the conditional access module 140 at a moment t9 and shortly after the first grant signal grant0 has a logic low at a moment t10 as shown in FIG. 5, the transport stream mode of the CI/CA module 100 will be started by the bridge 150 for transmitting the transport stream TS_DATA at the next-period.

Figure 7:
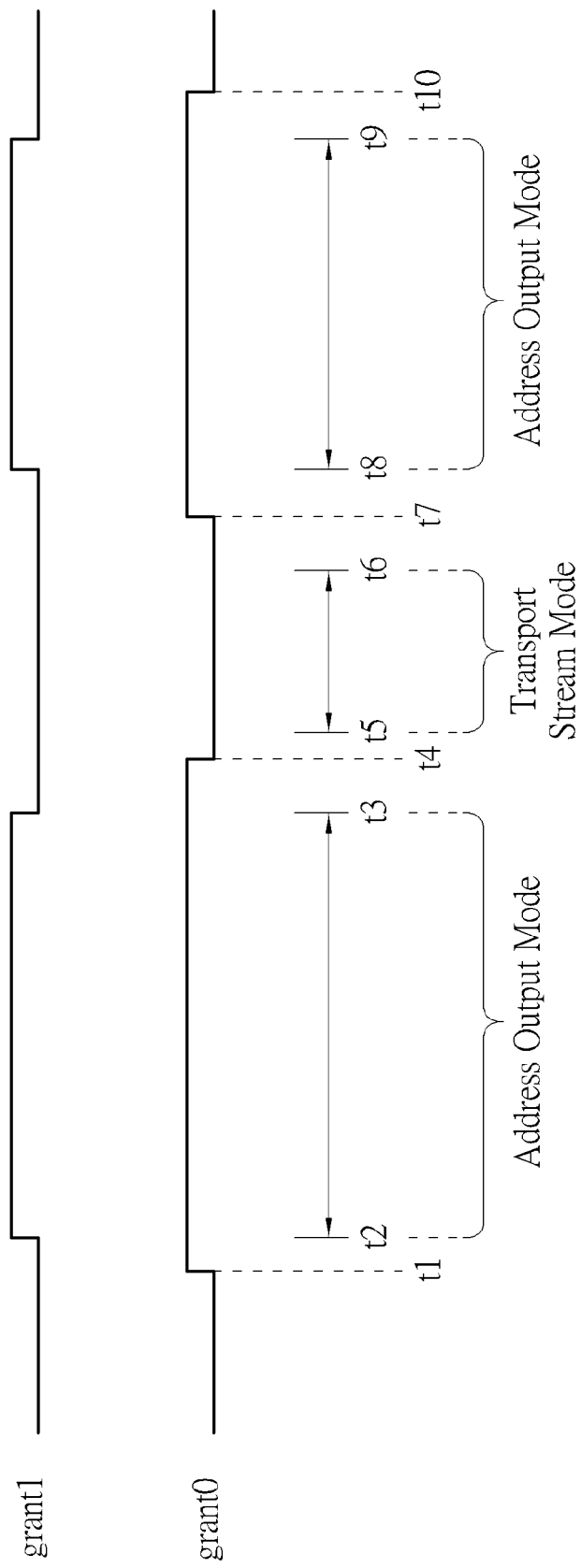
FIG. 7 illustrates a waveform of separately running the address output mode and the transport data mode of the CI/CA module shown in FIG. 4 according to the second embodiment.

FIG. 7 illustrates a waveform of separately running the address output mode and the transport stream mode of the CI/CA module 400 shown in FIG. 4 according to the second embodiment.

As shown in FIG. 7, the address output mode is interleaved with the transport stream mode in a separated manner, where one clock period is periodically formed by combining one time of the address output mode and one time of the transport stream mode.

Waveform of separately running the address output mode and the transport stream mode of the CI/CA module 400 shown in FIG. 7 is substantially the same as waveform of separately running the data output mode (the data input mode) and the transport stream mode of the CI/CA module 100 shown in FIG. 6. The running of the data output mode (the data input mode) is replaced with the running of the address output mode. Repeated operations related to FIG. 7 are not further described for brevity.

In some embodiments, functions of the logic high and the logic low of the first grant signal grant0 or the second grant signal grant1 may be reverse to those mentioned above, and embodiments formed by reverse functions indicated by different logic state of the first grant signal grant0 or the second grant signal grant1 should also be regarded as embodiments.

In the above-listed embodiments, as shown in FIGS. 1-5, the transport stream TS_DATA is received from a transport stream source external to the CI/CA module by the bridge 150. However, in some embodiments, the transport stream TS_DATA may also be generated from an internal module of the CI/CA module, such as a demodulator.

Figure 8:
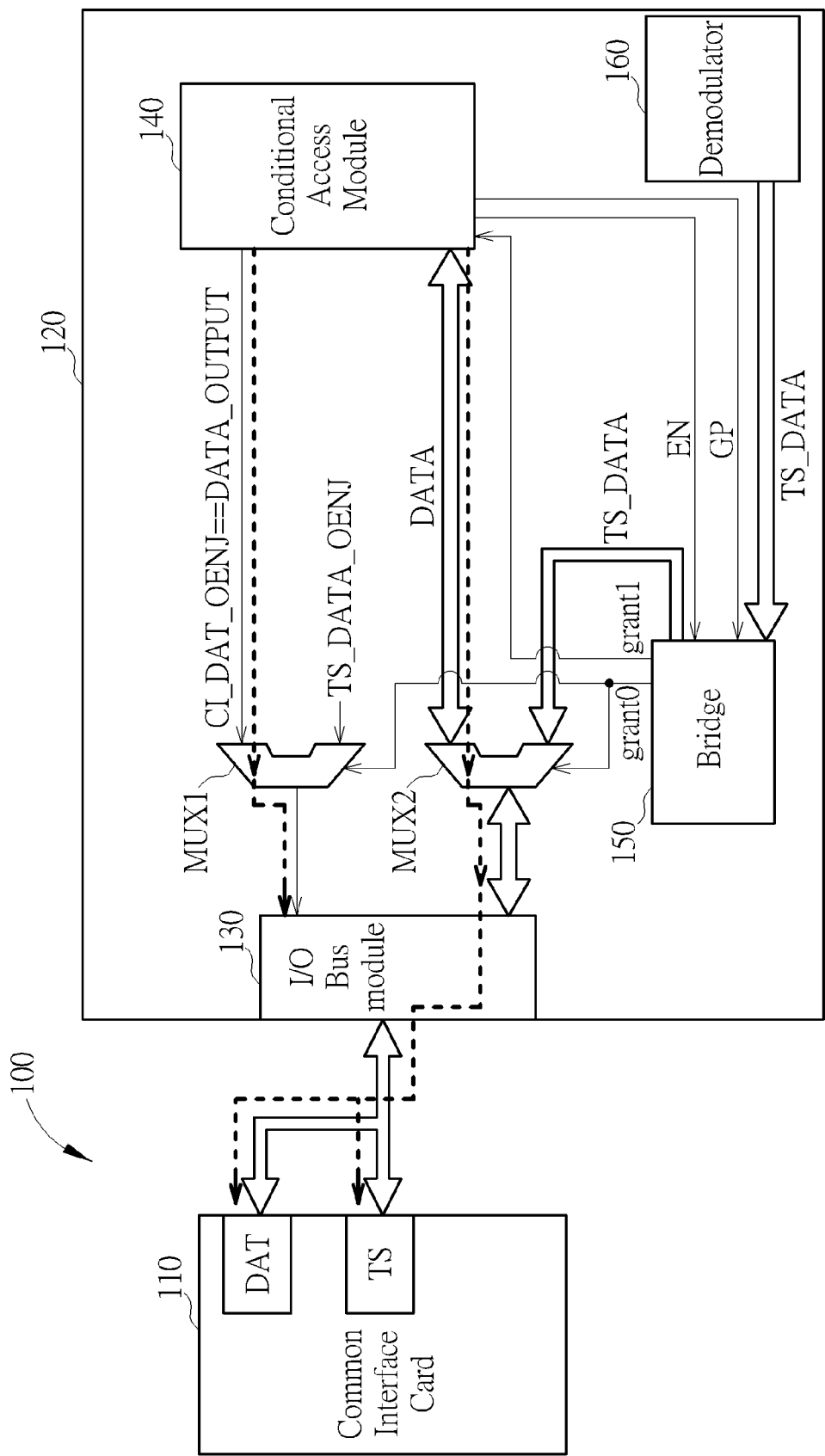
FIGS. 8-10 illustrate the CI/CA module shown in FIG. 1 utilizing an internal demodulator for generating a transport stream according to the first embodiments.
Figure 9:
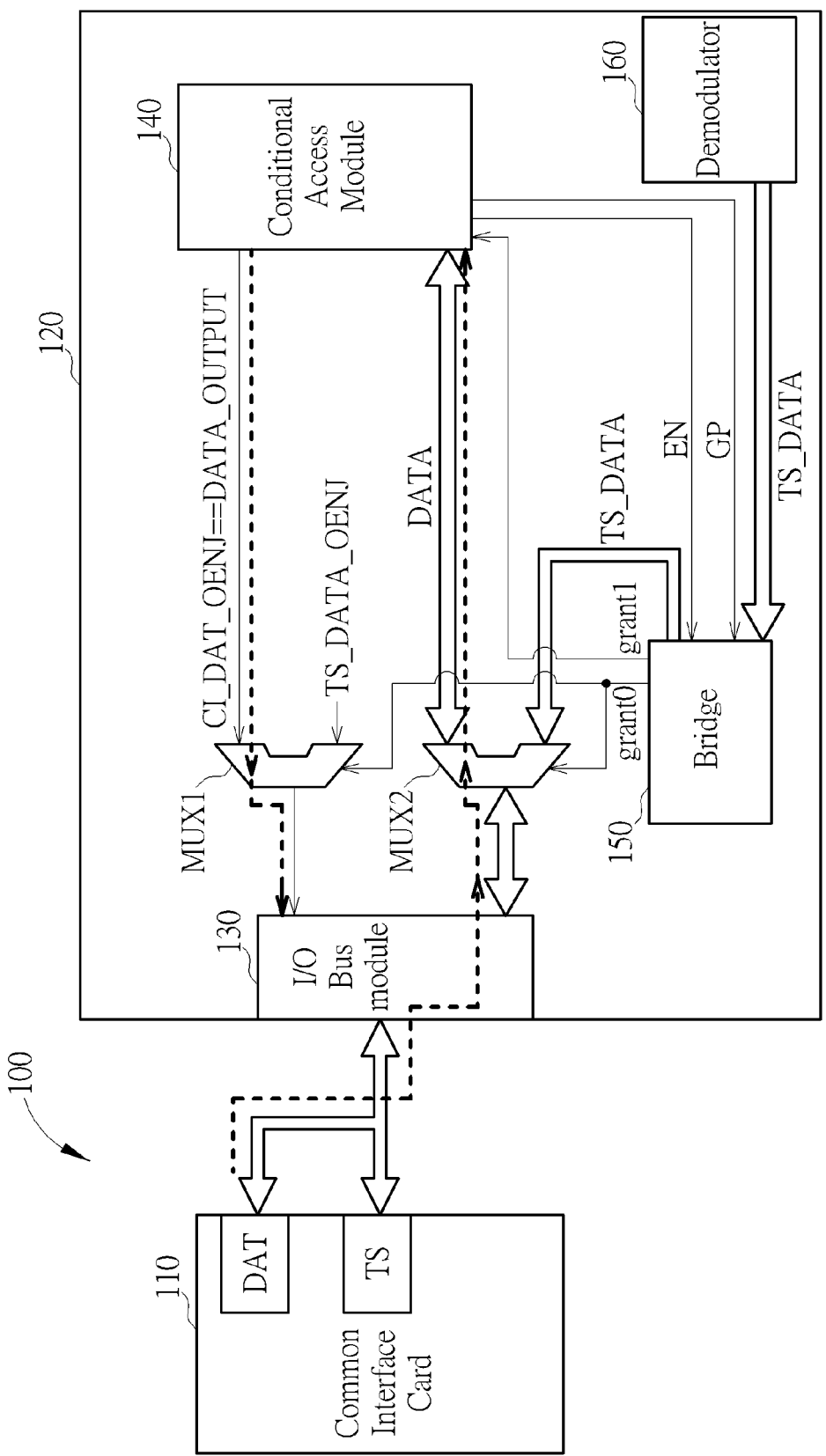
Figure 10:
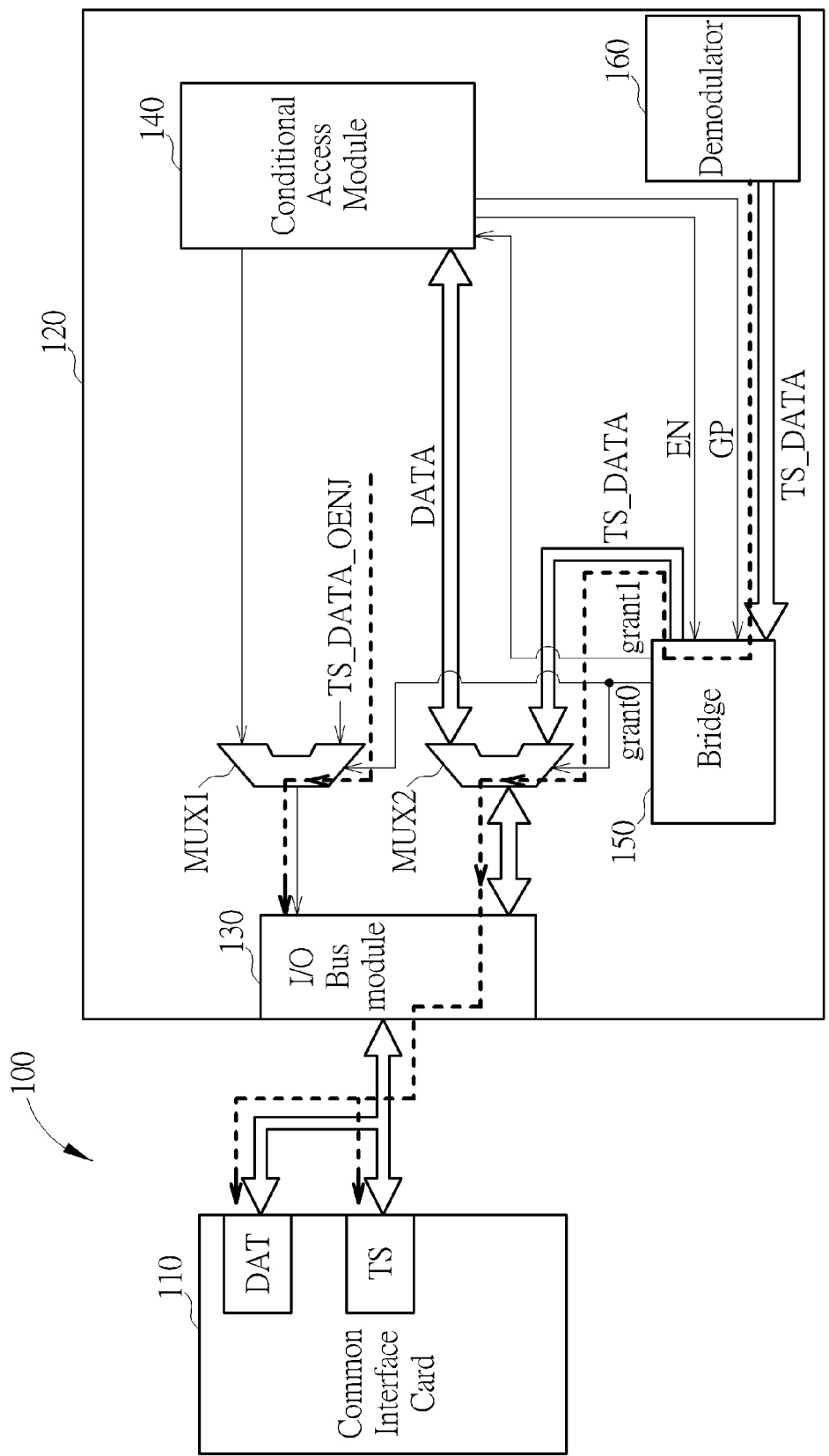

FIGS. 8-10 illustrate the CI/CA module 100 shown in FIG. 1 utilizing an internal demodulator for generating the transport stream TS_DATA according to embodiments. Note that the CI/CA module 100 shown in FIG. 8 is under the data output mode, the CI/CA module 100 shown in FIG. 9 is under the data input mode, and the CI/CA module 100 shown in FIG. 10 is under the transport stream mode; therefore, operations of the CI/CA module 100 shown in FIG. 8 are substantially the same as the operations of the CI/CA module 100 shown in FIG. 1, operations of the CI/CA module 100 shown in FIG. 9 are substantially the same as the operations of the CI/CA module 100 shown in FIG. 2, and operations of the CI/CA module 100 shown in FIG. 10 are substantially the same as the operations of the CI/CA module 100 shown in FIG. 3. Repeated operations related to FIGS. 8-10 are not further described for brevity.

Figure 11:
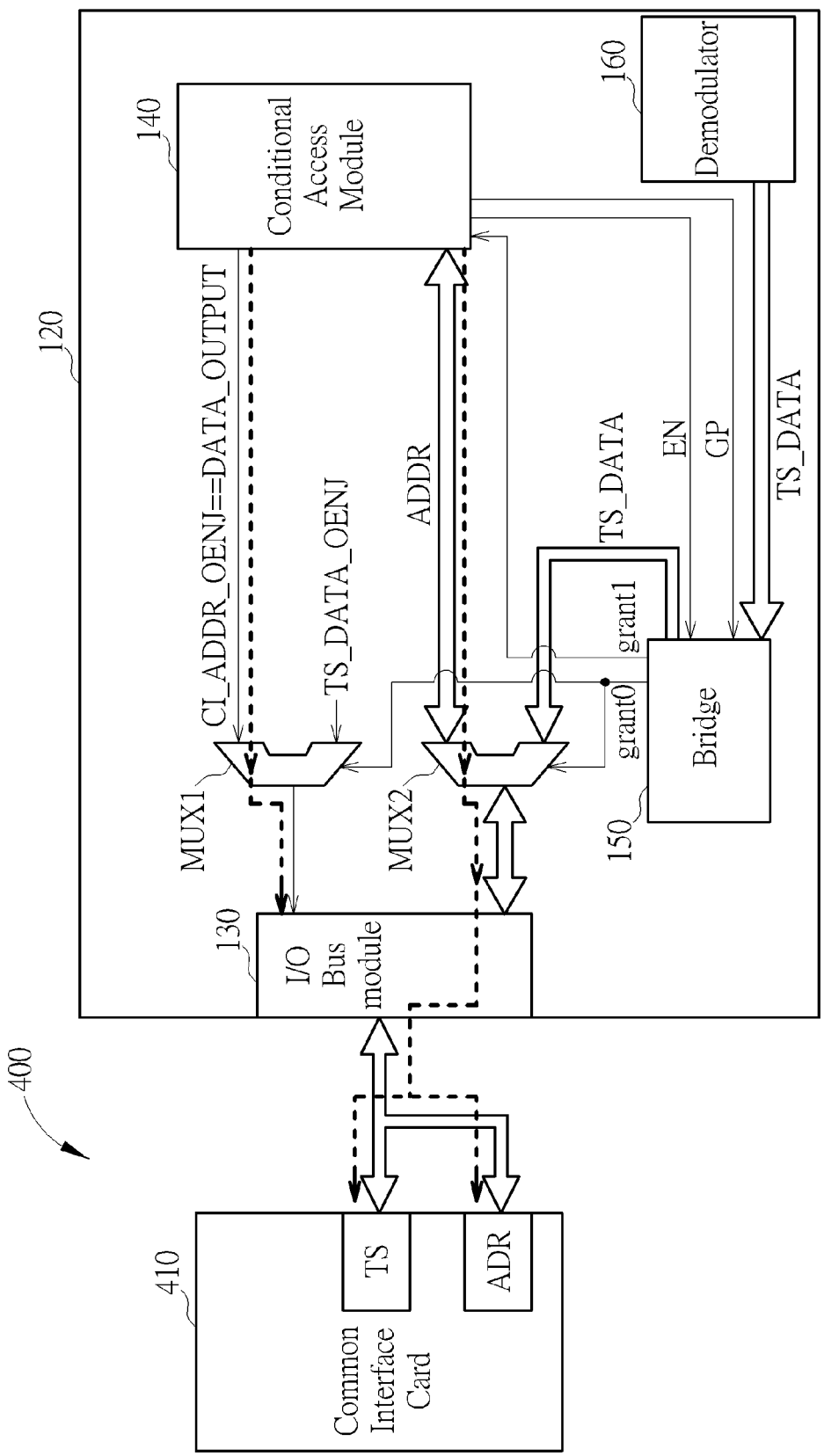
FIGS. 11-12 illustrate the CI/CA module shown in FIG. 4 utilizing an internal demodulator for generating a transport stream according to the second embodiments.
Figure 12:
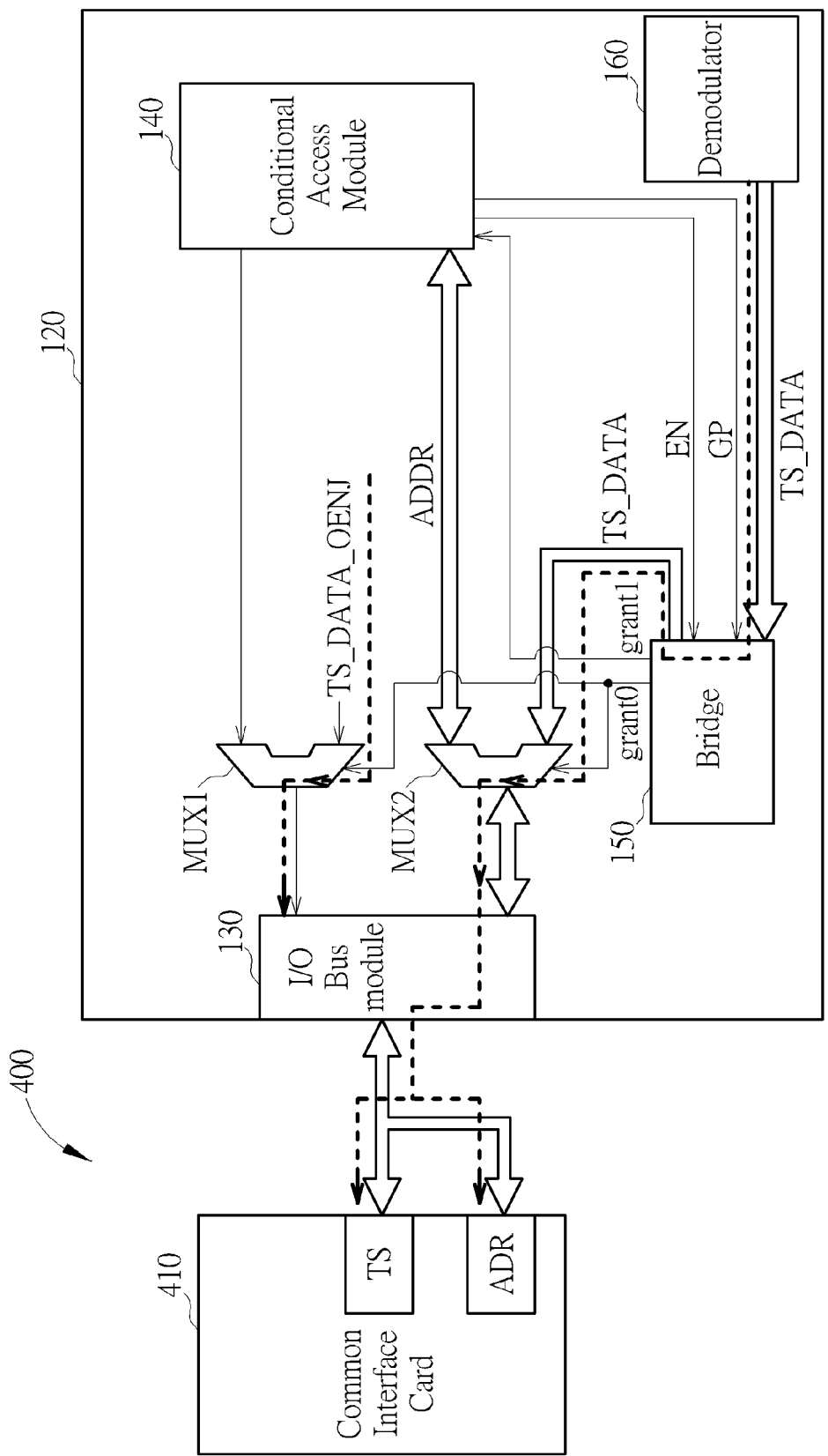

FIGS. 11-12 illustrate the CI/CA module 400 shown in FIG. 4 utilizing an internal demodulator for generating the transport stream TS_DATA according to embodiments. Note that the CI/CA module 100 shown in FIG. 11 is under the address output mode, and the CI/CA module 400 shown in FIG. 12 is under the transport stream mode; therefore, operations of the CI/CA module 400 shown in FIG. 11 are substantially the same as the operations of the CI/CA module 400 shown in FIG. 4, and operations of the CI/CA module 400 shown in FIG. 12 are substantially the same as the operations of the CI/CA module 400 shown in FIG. 5. Repeated operations related to FIGS. 11-12 are not further described for brevity.

Figure 13:
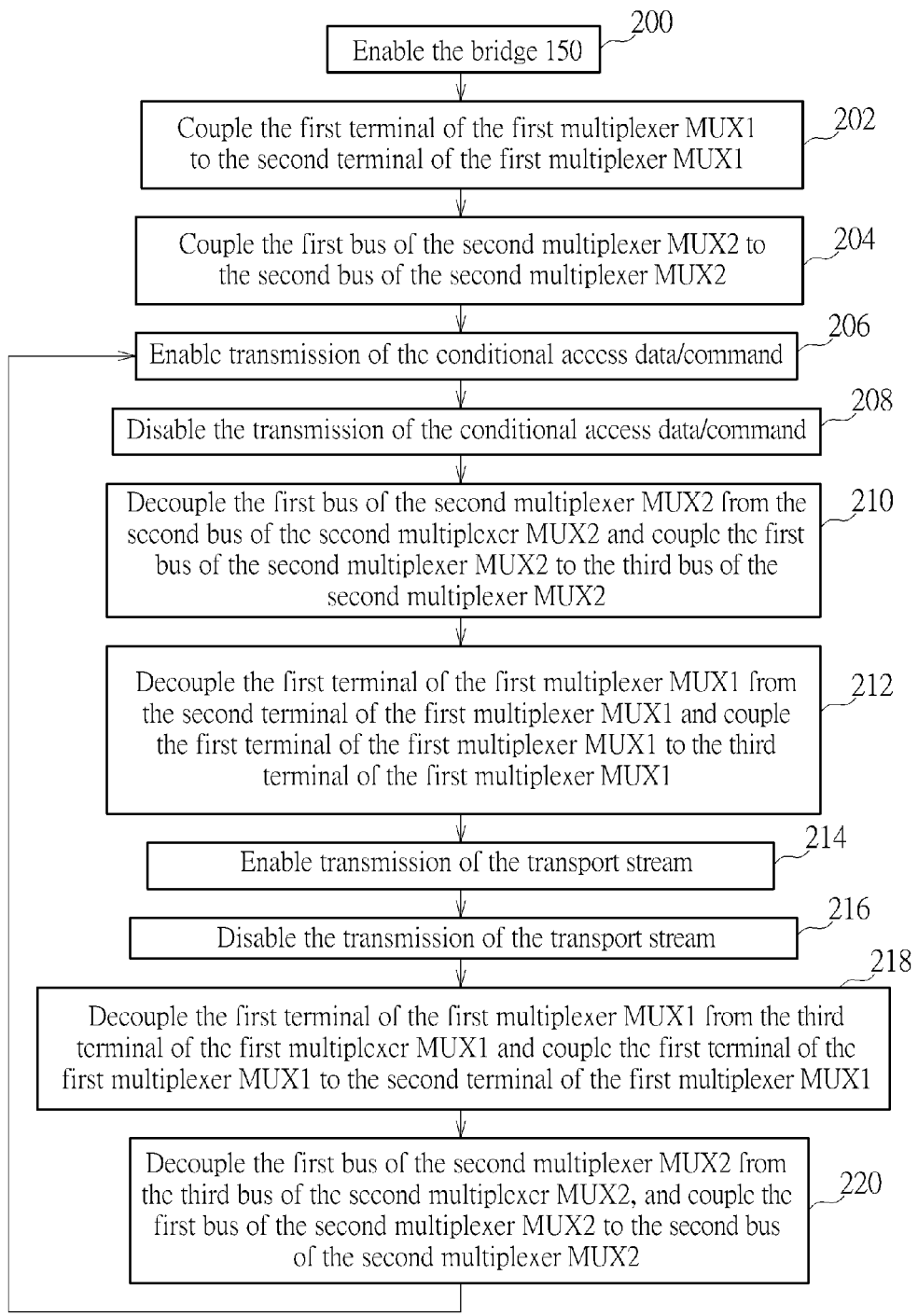
FIG. 13 illustrates a method of transmitting a conditional access data/command and a transport stream between a CI card and an integrated circuit module.

FIG. 13 illustrates a method of transmitting a conditional access data/command and a transport stream between a CI card and the integrated circuit module 120. The CI card can be the common interface card 110 or the common interface card 410 depending on the conditional access data/command. The conditional access data/command can be one of a data output, a data input, or an address. The method illustrated in FIG. 13 can base on the diagram shown in FIG. 6 or FIG. 7, depending on the CI card used, for describing the interleaving of the transport stream mode and the data output mode/the data input mode/the address output mode of the CI/CA module. As shown in FIG. 13, the method includes the following steps:

Step 200: Enable the bridge 150 by setting the third grant signal EN as logic high and acquire logic setting for the first grant signal grant0 and the second grant signal grant1;

Step 202: Couple the first terminal of the first multiplexer MUX1 to the second terminal of the first multiplexer MUX1 when the first grant signal grant0 changes to a first state so as to transmit an I/O switch signal to the I/O bus module 130 for enabling transmission between the CI card and the I/O bus module 130;

Step 204: Couple the first bus of the second multiplexer MUX2 to the second bus of the second multiplexer MUX2;

Step 206: Enable transmission of the conditional access data/command between the first bus of the conditional access module 140 and the second bus of the second multiplexer MUX2 when the second grant signal grant1 changes to a second state;

Step 208: After the transmission of the conditional access data/command between the first bus of the conditional access module 140 and the second bus of the second multiplexer MUX2 is enabled for a first period of time, disable the transmission of the conditional access data/command between the first bus of the conditional access module 140 and the second bus of the second multiplexer MUX2 when the second grant signal grant1 changes to a third state;

Step 210: Decouple the first bus of the second multiplexer MUX2 from the second bus of the second multiplexer MUX2 and couple the first bus of the second multiplexer MUX2 to the third bus of the second multiplexer MUX2 according to a fourth state of the first grant signal grant0

Step 212: Decouple the first terminal of the first multiplexer MUX1 from the second terminal of the first multiplexer MUX1 when the first grant signal grant0 changes to the fourth state to stop transmitting the data I/O switch signal CI_DAT_OENJ to the I/O bus module 130 and disable the transmission between the CI card and the I/O bus module 130, and couple the first terminal of the first multiplexer MUX1 to the third terminal of the first multiplexer MUX1 according to the fourth state of the first grant signal grant0 so as to transmit the transport stream I/O switch signal TS_DATA_OENJ to the I/O bus module 130 for enabling transmission between the CI card and the I/O bus module 130;

Step 214: Transmit the transport stream from the second bus of the bridge 150 to the third bus of the second multiplexer MUX2 when a third grant signal EN is in fifth state;

Step 216: After the transmission of the transport stream from the second bus of the bridge to the third bus of the second multiplexer MUX2 is enabled for a second period of time, disable the transmission of the transport stream from the second bus of the bridge 150 to the third bus of the second multiplexer MUX2 when the third grant signal EN is in fifth state;

Step 218: Decouple the first terminal of the first multiplexer MUX1 from the third terminal of the first multiplexer MUX1 when the first grant signal grant0 changes to the first state for stopping transmitting the transport stream I/O switch signal TS_DATA_OENJ to the I/O bus module 130 for disabling the transmission between the CI card and the I/O bus module 130, and couple the first terminal of the first multiplexer MUX1 to the second terminal of the first multiplexer MUX1 when the first grant signal grant0 changes to the first state;

Step 220: Decouple the first bus of the second multiplexer MUX2 from the third bus of the second multiplexer MUX2, and couple the first bus of the second multiplexer MUX2 to the second bus of the second multiplexer MUX2 when the first grant signal grant0 changes to the first state, and go to Step 206.

In view of FIG. 6 or FIG. 7, depending on the CI card used, take one single clock period in the time frame from the moment t1 to the moment t7 as an example, correspondence between the above-listed steps and the moments shown in FIG. 6 or FIG. 7 under the condition that the bridge 150 has been enabled by setting the third grant signal EN as logic high is listed as the following:

(1) Step 202 and Step 204 are performed at the moment t1, and even at the moment t7;
(2) Step 206 is performed from the moment t2 to the moment t3, and from the moment t8 to the moment t9;
(3) Step 208 is performed at the moment t3, and the moment t9;
(4) Step 210 and Step 212 are performed at the moment t4;
(5) Step 214 is performed in a time frame between the moment t5 and the moment t6;
(6) Step 216 is performed at the moment t6;
(7) Step 218 and Step 220 are performed at the moment t7; and a next step of start transmitting the conditional access data/command can be performed by Step 206 as a next period.

Note that the first state mentioned in Step 202 and Step 204 may indicate a rising edge of the first grant signal grant0 at the moment t1; the second state mentioned in Step 206 may indicate a rising edge of the second grant signal grant1 at the moment t2; the third state mentioned in Step 208 indicate a falling edge of the second grant signal grant1 at the moment t3; the fourth state mentioned in Step 210 and Step 212 may indicate a falling edge of the first grant signal grant0 at the moment t4. Furthermore, the fifth state of the third grant signal EN mentioned in Step 214 may indicate an enabling signal for the bridge 150 to start the transmission of the transport stream TS_DATA.

The present invention discloses CI/CA modules for transmitting a conditional access data/command and a transport stream between a CI card and an integrated circuit module, and discloses a method of transmitting the conditional access data/command and the transport stream in an interleaving manner. As a result, the conditional access data/command and the transport stream can be transmitted by the CI/CA module by using the same port, i.e., the I/O bus module 130 shown in FIGS. 1-5 and 8-12, whereas at least two different and separated ports are required for transmitting the conditional access data/command and the transport stream in a conventional CI/CA module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A common interface/conditional access (CI/CA) module, comprising:
   a common interface card, comprising a data bus and a transport stream bus; and
   an integrated circuit chip, comprising:
      an input/output (I/O) bus module, having a first bus coupled to the data bus, and the transport stream bus of the common interface card;
      a bridge, having a first bus for receiving a transport stream and configured to set a first grant signal and a second grant signal according to a grant period signal;

a conditional access module, having a first terminal coupled to a first terminal of the bridge and configured to enable the bridge, having a second terminal coupled to a second terminal of the bridge and configured to provide the grant period signal to the bridge, and having a grant terminal coupled to a third terminal of the bridge and configured to receive the second grant signal from the bridge for enabling transmission of a conditional access data/command;

a first multiplexer, having a first terminal coupled to a first terminal of the I/O bus module and configured to transmit an I/O control signal to the I/O bus module for controlling an I/O mode of the I/O bus module, having a second terminal coupled to a third terminal of the conditional access module and configured to receive a data I/O switch signal, having a third terminal configured to receive a transport stream I/O switch signal, and having a select terminal coupled to a fourth terminal of the bridge and configured to receive the first grant signal for coupling the first terminal of the first multiplexer to the second terminal of the first multiplexer or the third terminal of the first multiplexer; and a second multiplexer, having a first bus coupled to a second bus of the I/O bus module, having a second bus coupled to a first bus of the conditional access module and configured to transmit the conditional access data/command, having a third bus coupled to a second bus of the bridge and configured to receive the transport stream from the bridge, and having a select terminal coupled to the fourth terminal of the bridge and configured to receive the first grant signal from the bridge for coupling the first bus of the second multiplexer to the second bus of the second multiplexer or the third bus of the second multiplexer.

2. The CI/CA module of claim 1, wherein under a data output mode of the CI/CA module, the select terminal of the first multiplexer is configured to receive the first grant signal for coupling the first terminal of the first multiplexer to the second terminal of the first multiplexer, the select terminal of the second multiplexer is configured to receive the first grant signal for coupling the first bus of the second multiplexer to the second bus of the second multiplexer, the grant terminal of the conditional access module is configured to receive the second grant signal for enabling the transmission of the conditional access data/command from the first bus of the conditional access module to the second bus of the second multiplexer, the I/O signal is configured to control the I/O bus module to transmit the conditional access data/command to the common interface card, and the conditional access data/command comprises control data for the common interface card.

3. The CI/CA module of claim 1, wherein under a data input mode of the CI/CA module, the select terminal of the first multiplexer is configured to receive the first grant signal for coupling the first terminal of the first multiplexer to the second terminal of the first multiplexer, the select terminal of the second multiplexer is configured to receive the first grant signal for coupling the first bus of the second multiplexer to the second bus of the second multiplexer, the grant terminal of the conditional access module is configured to receive the second grant signal for enabling the transmission of the conditional access data/command from the second bus of the second multiplexer to the first bus of the conditional access module, and the I/O signal is configured to control the I/O bus module to receive the conditional access data/command from the common interface card.

4. The CI/CA module of claim 1, wherein under a transport stream mode of the CI/CA module, the select terminal of the first multiplexer is configured to receive the first grant signal for coupling the first terminal of the first multiplexer to the third terminal of the first multiplexer, the select terminal of the second multiplexer is configured to receive the first grant signal for coupling the first bus of the second multiplexer to the third bus of the second multiplexer, the I/O signal is configured to control the I/O bus module to transmit the transport stream to the common interface card.

5. The CI/CA module of claim 1, wherein the first bus of the bridge is coupled to a transport stream source external to the CI/CA module for receiving the transport stream.

6. The CI/CA module of claim 1, wherein the integrated circuit chip further comprises a demodulator configured to generate the transport stream, and the first bus of the bridge is coupled to the demodulator and configured to receive the transport stream.

7. The CI/CA module of claim 1, wherein a period of the second grant signal is covered by a period of the first grant signal.

8. The CI/CA module of claim 1, wherein a period of transmitting the conditional access data/command by the I/O bus module and a period of transmitting the transport stream by the I/O bus module are separated by a delay period set by the bridge.

9. A common interface/conditional access (CI/CA) module, comprising:

a common interface card, comprising an address bus and a transport stream bus; and an integrated circuit chip, comprising:

an I/O bus module, having a first bus coupled the address bus and the transport stream bus of the common interface card;

a bridge, having a first bus for receiving a transport stream and configured to set a first grant signal and a second grant signal according to a grant period signal;

a conditional access module, having a first terminal coupled to a first terminal of the bridge and configured to enable the bridge, having a second terminal coupled to a second terminal of the bridge and configured to provide the grant period signal to the bridge, and having a grant terminal coupled to a third terminal of the bridge and configured to receive the second grant signal from the bridge for enabling transmission of a conditional access data/command;

a first multiplexer, having a first terminal coupled to a first terminal of the I/O bus module and configured to transmit an I/O control signal to the I/O bus module for controlling an I/O mode of the I/O bus module, having a second terminal coupled to a third terminal of the conditional access module and configured to receive an address I/O switch signal, having a third terminal configured to receive a transport stream I/O switch signal, and having a select terminal coupled to a fourth terminal of the bridge and configured to receive the first grant signal for coupling the first terminal of the first multiplexer to the second terminal of the first multiplexer or the third terminal of the first multiplexer; and a second multiplexer, having a first bus coupled to a second bus of the I/O bus module, having a second bus coupled to a first bus of the conditional access module and configured to transmit the conditional access data/command, having a third bus coupled to a second bus of the bridge and configured to receive the transport stream from the bridge, and having a select terminal coupled to the fourth terminal of the bridge and configured to receive the first grant signal from the bridge for coupling the first bus of the second multiplexer to the second bus of the second multiplexer or the third bus of the second multiplexer.

10. The CI/CA module of claim 9, wherein under an address output mode of the CI/CA module, the select terminal of the first multiplexer is configured to receive the first grant signal for coupling the first terminal of the first multiplexer to the second terminal of the first multiplexer, the select terminal of the second multiplexer is configured to receive the first grant signal for coupling the first bus of the second multiplexer to the second bus of the second multiplexer, the grant terminal of the conditional access module is configured to receive the second grant signal for enabling the transmission of the conditional access data/command from the first bus of the conditional access module to the second bus of the second multiplexer, the I/O signal is configured to control the I/O bus module to transmit the conditional access data/command to the common interface card, and the conditional access data/command comprises control addresses for the common interface card.

11. The CI/CA module of claim 9, wherein under a transport stream mode of the CI/CA module, the select terminal of the first multiplexer is configured to receive the first grant signal for coupling the first terminal of the first multiplexer to the third terminal of the first multiplexer, the select terminal of the second multiplexer is configured to receive the first grant signal for coupling the first bus of the second multiplexer to the third bus of the second multiplexer, the I/O signal is configured to control the I/O bus module to transmit the transport stream to the common interface card.

12. The CI/CA module of claim 9, wherein the first bus of the bridge is coupled to a transport stream source external to the CI/CA module for receiving the transport stream.

13. The CI/CA module of claim 9, wherein the integrated circuit chip further comprises a demodulator configured to generate the transport stream, and the first bus of the bridge is coupled to the demodulator and configured to receive the transport stream.

14. The CI/CA module of claim 9, wherein a period of the second grant signal is covered by a period of the first grant signal.

15. The CI/CA module of claim 9, wherein a period of transmitting the conditional access data/command by the I/O bus module and a period of transmitting the transport stream by the I/O bus module are separated by a delay period set by the bridge.

16. A method of transmitting data between a common interface card and an integrated circuit chip of a CI/CA module; the integrated circuit chip comprising an I/O bus module, a bridge, a conditional access module, a first multiplexer, and a second multiplexer; the I/O bus module having a first bus coupled to the common interface card; the bridge having a first bus for receiving a transport stream; the conditional access module having a first terminal coupled to a first terminal of the bridge, having a second terminal coupled to a second terminal of the bridge, and having a grant terminal coupled to a third terminal of the bridge and configured to receive a second grant signal; the first multiplexer having a first terminal coupled to a first terminal of the I/O bus module, a second terminal coupled to a third terminal of the conditional access module and configured to receive a data I/O switch signal, a third terminal configured to receive a transport stream I/O switch signal, and a select terminal coupled to a fourth terminal of the bridge and configured to receive a first grant signal; the second multiplexer having a first bus coupled to a second bus of the I/O bus module, having a second bus coupled to a first bus of the conditional access module and configured to receive a conditional access data/command from the conditional access module, having a third bus coupled to a second bus of the bridge and configured to receive a transport stream, and having a select terminal coupled to the fourth terminal of the bridge and configured to receive the first grant signal; the method comprising:

coupling the first terminal of the first multiplexer to the second terminal of the first multiplexer when the first grant signal changes to a first state so as to transmit a data I/O switch signal to the I/O bus module for enabling transmission between the common interface card and the I/O bus module;

coupling the first bus of the second multiplexer to the second bus of the second multiplexer while coupling the first terminal of the first multiplexer to the second terminal of the first multiplexer;

after coupling the first terminal of the first multiplexer to the second terminal of the first multiplexer, enabling transmission of the conditional access data/command between the first bus of the conditional access module and the second bus of the second multiplexer when the second grant signal changes to a second state;

after the transmission of the conditional access data/command between the first bus of the conditional access module and the second bus of the second multiplexer is enabled for a first period of time, disabling the transmission of the conditional access data/command between the first bus of the conditional access module and the second bus of the second multiplexer when the second grant signal changes to a third state;

after the transmission of the conditional access data/command between the first bus of the conditional access module and the second bus of the second multiplexer is disabled, decoupling the first bus of the second multiplexer from the second bus of the second multiplexer;

while decoupling the first bus of the second multiplexer from the second bus of the second multiplexer, decoupling the first terminal of the first multiplexer from the second terminal of the first multiplexer when the first grant signal changes to a fourth state to stop transmitting the data I/O switch signal to the I/O bus module and disable the transmission between the common interface card and the I/O bus module;

coupling the first bus of the second multiplexer to the third bus of the second multiplexer according to the fourth state of the first grant signal while decoupling the first bus of the second multiplexer from the second bus of the second multiplexer;

coupling the first terminal of the first multiplexer to the third terminal of the first multiplexer according to the fourth of the first grant signal while decoupling the first terminal of the first multiplexer from the second terminal of the first multiplexer, so as to transmit a transport stream I/O switch signal to the I/O bus module for enabling transmission between the common interface card and the I/O bus module;

after coupling the first terminal of the first multiplexer to the third terminal of the first multiplexer, enabling transmission of the transport stream from the second bus of the bridge to the third bus of the second multiplexer when a third grant signal is in a fifth state;

after the transmission of the transport stream from the second bus of the bridge to the third bus of the second multiplexer is enabled for a second period of time, disabling the transmission of the transport stream from the second bus of the bridge to the third bus of the second multiplexer when the third grant signal is in a fifth state;

after the transmission of the transport stream from the second bus of the bridge to the third bus of the second multiplexer is disabled, decoupling the first terminal of the first multiplexer from the third terminal of the first multiplexer when the first grant signal changes to the first state for stopping transmitting the transport stream I/O switch signal to the I/O bus module for disabling the transmission between the common interface card and the I/O bus module; and decoupling the first bus of the second multiplexer from the third bus of the second multiplexer while decoupling the first terminal of the first multiplexer from the third terminal of the first multiplexer.

17. The method of claim 16, wherein the common interface card comprises:

a data bus and a transport stream bus coupled to the first bus of the I/O bus module.

18. The method of claim 16, wherein the common interface card comprises:

an address bus and a transport stream bus coupled to the first bus of the I/O bus module.

19. The method of claim 16, further comprising receiving the transport stream from a transport stream source external to the CI/CA module.

20. The method of claim 16, further comprising generating the transport stream by a demodulator of the integrated circuit chip.

* * * * *